July 7, 1959 E. LINSKER 2,893,272
AUTOMATIC TOOL
Filed March 18, 1957 6 Sheets-Sheet 1
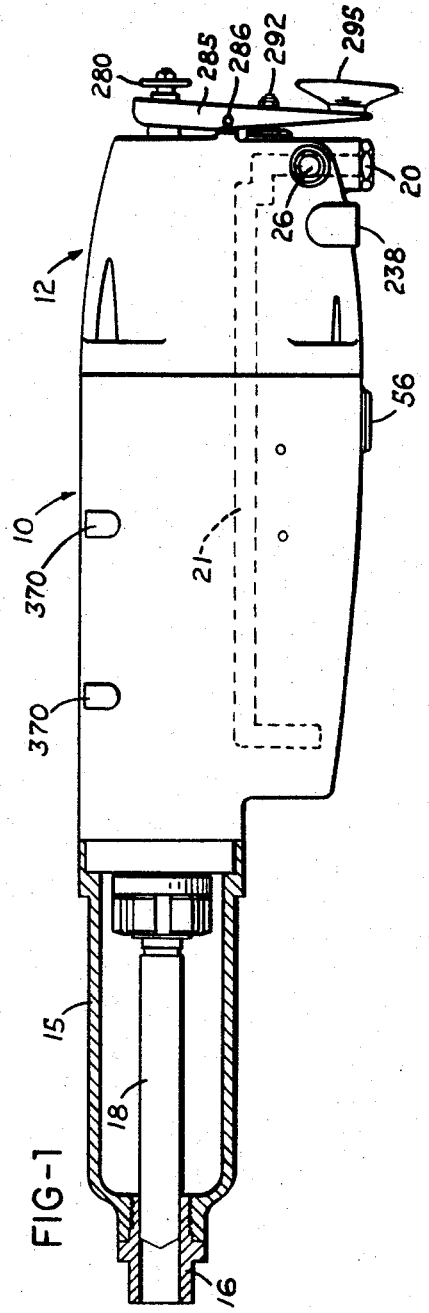
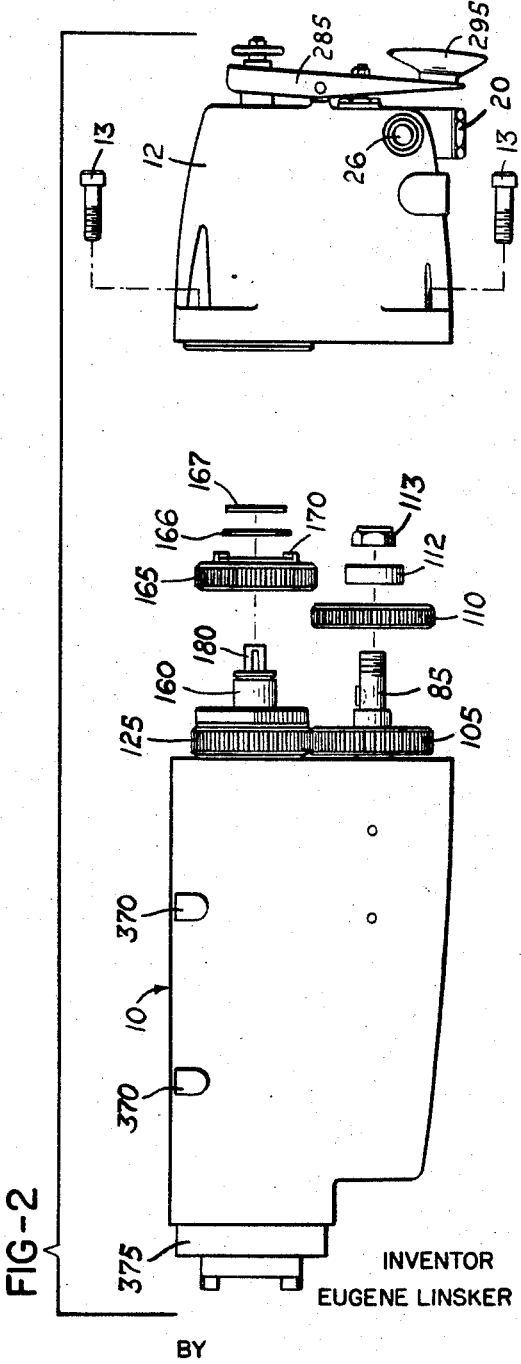
INVENTOR
EUGENE LINSKER
BY
Marechal, Biebel, French & Bugg
ATTORNEYS

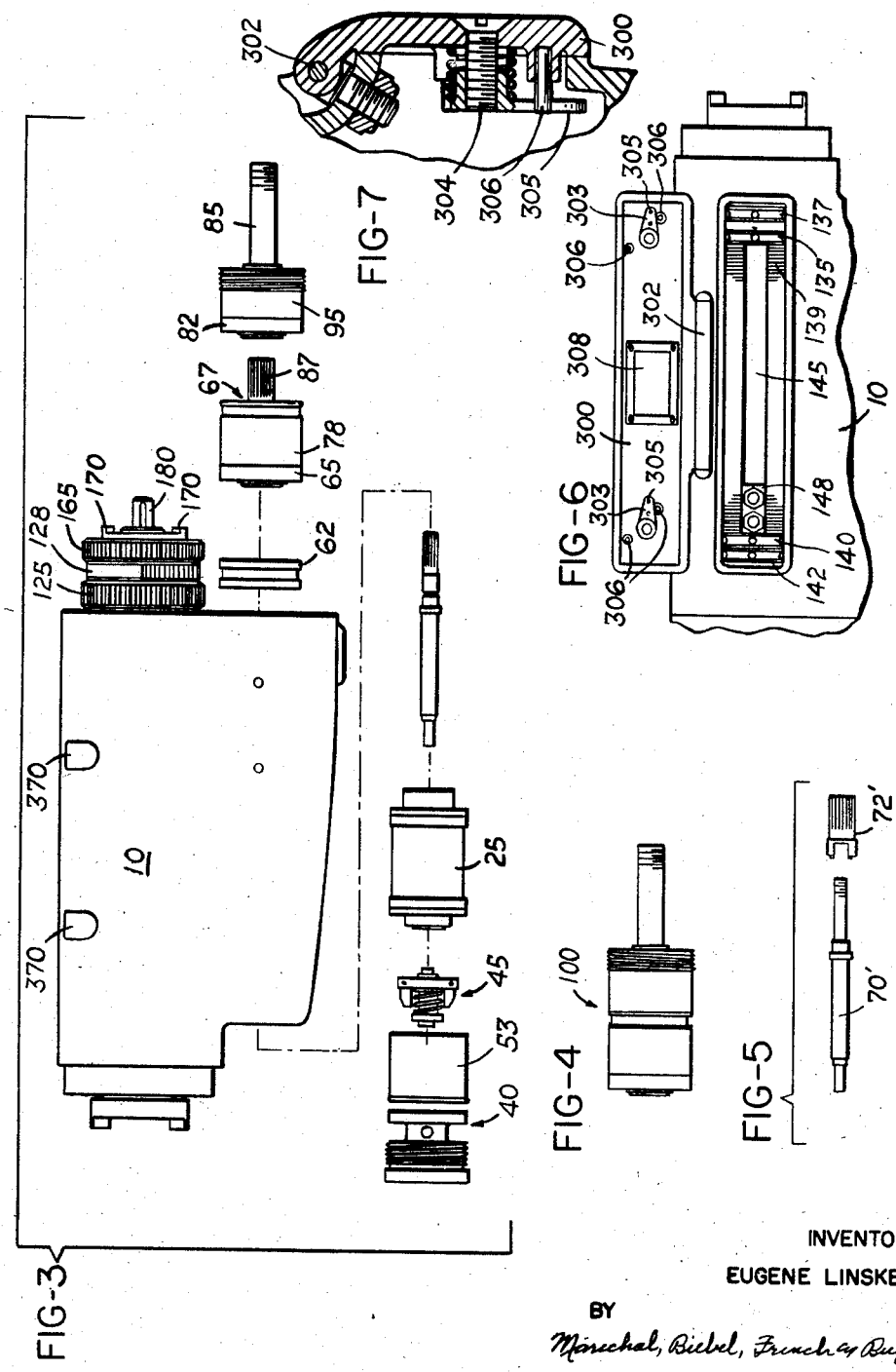

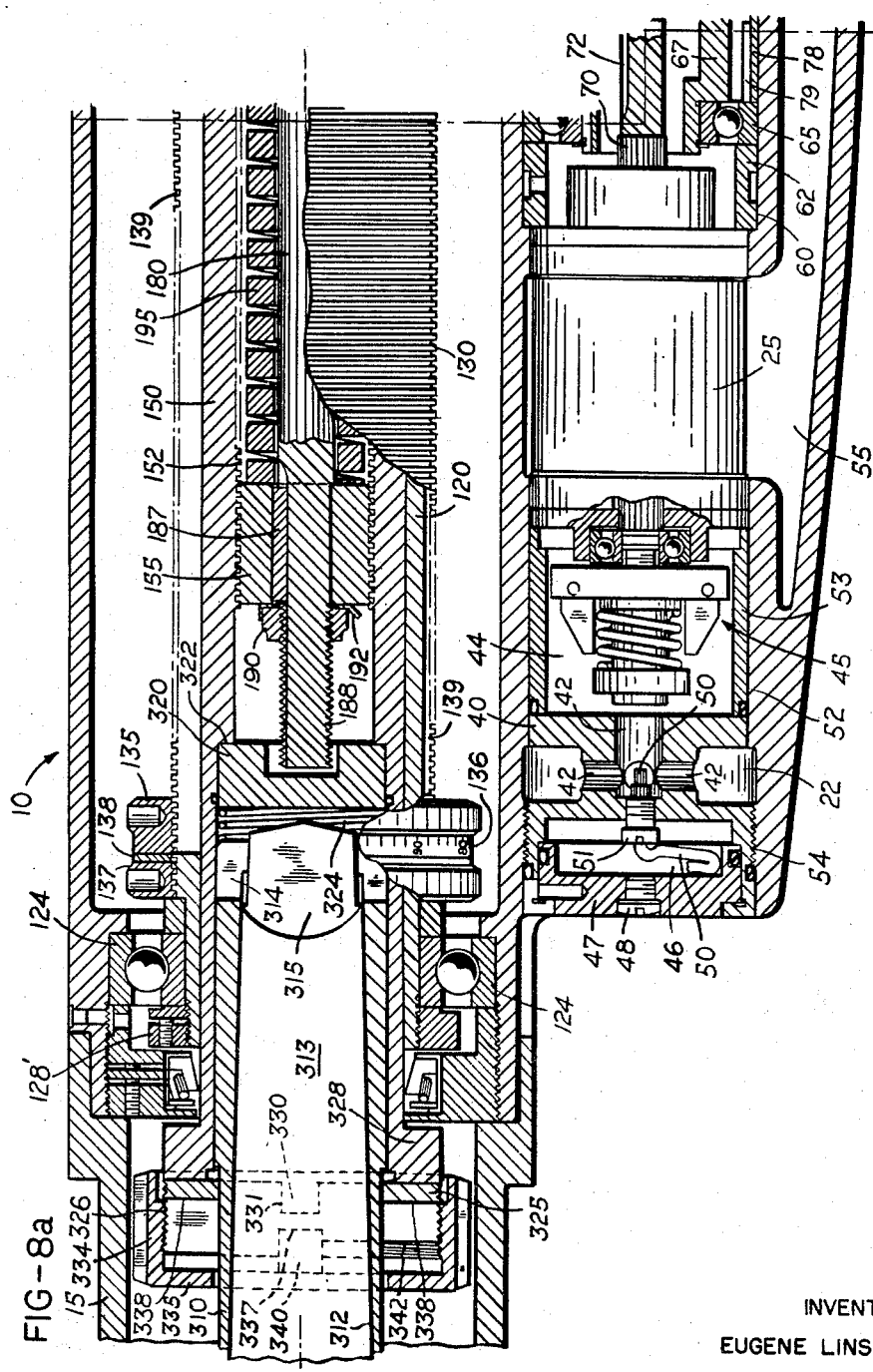

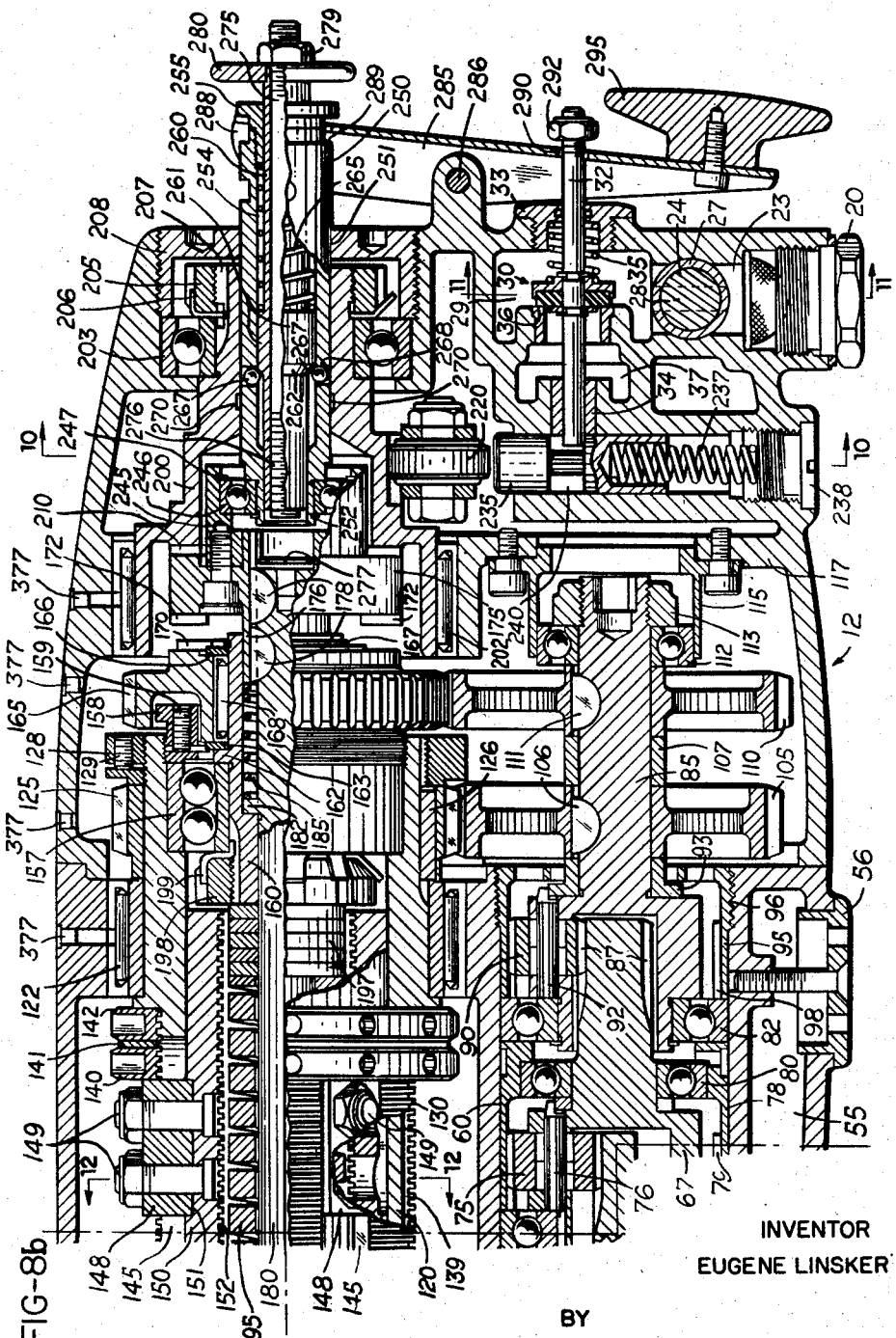

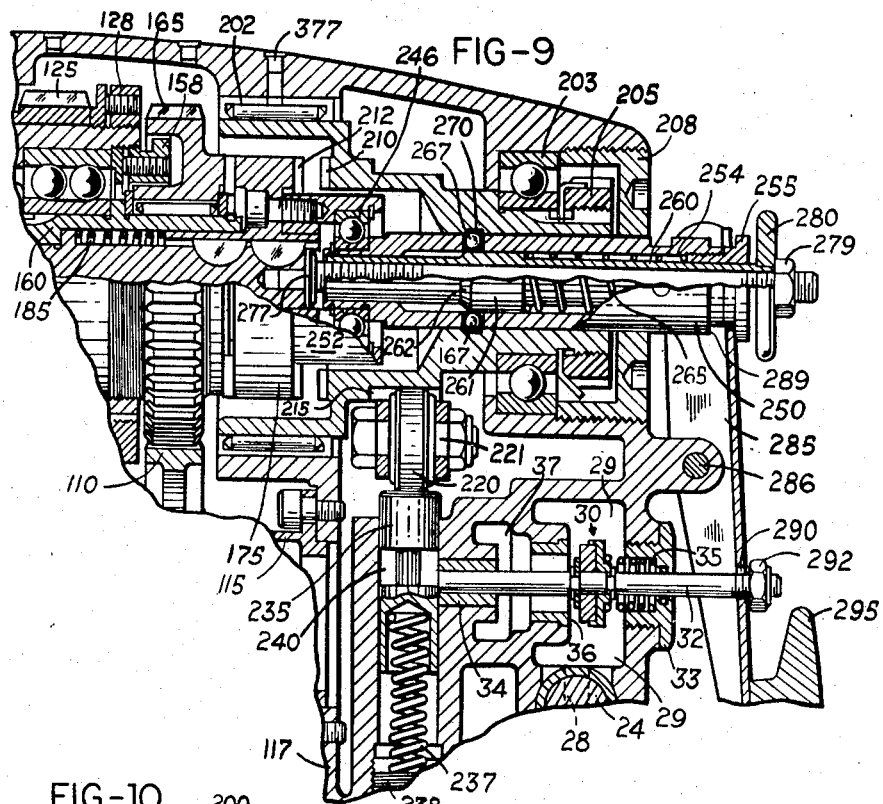
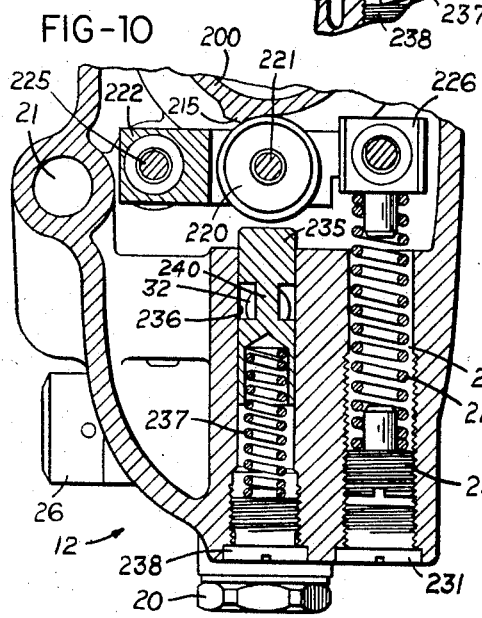
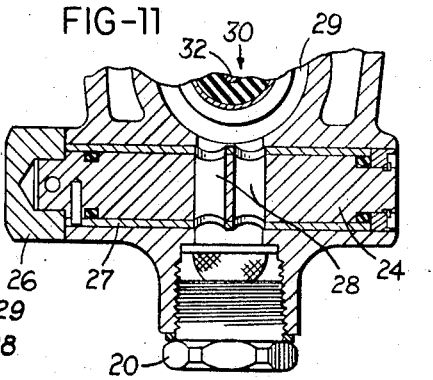
INVENTOR
EUGENE LINSKER

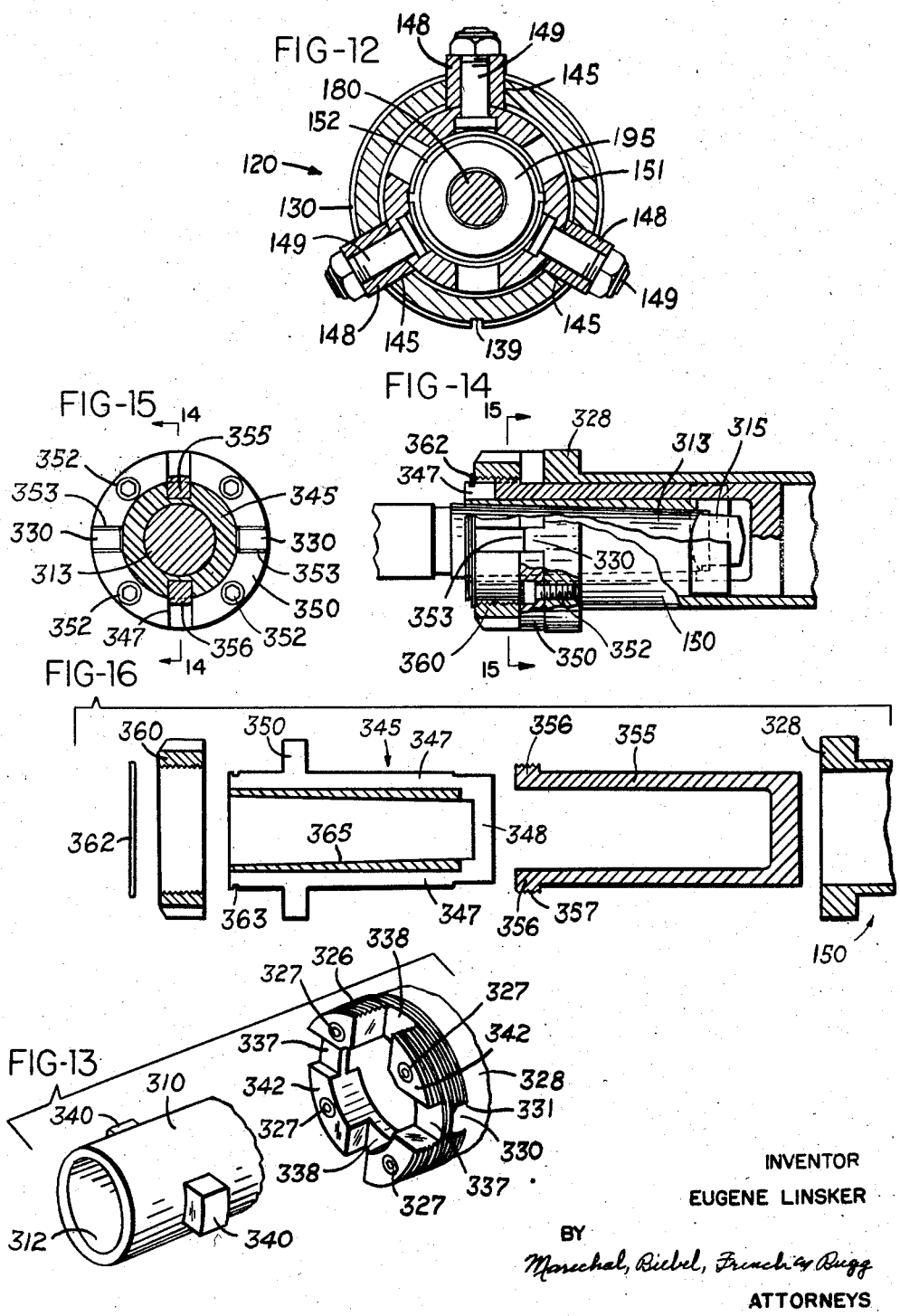

United States Patent Office 2,893,272
Patented July 7, 1959

2,893,272

AUTOMATIC TOOL

Eugene Linsker, Dayton, Ohio, assignor to Buckeye Tools Corporation, Dayton, Ohio, a corporation of Ohio Application March 18, 1957, Serial No. 646,722

12 Claims. (Cl. 77—32.5)

This invention relates to automatic machine tools, especially of the portable type, capable of performing a complete automatic cycle of operation.

The machine tool provided by this invention will perform, with appropriate cutting tools, a number of machining operations such as, for example, drilling, reaming, counterboring, countersinking, spot facing, boring, etc. All of these operations can be accomplished in a completely automatic cycle requiring only a starting motivation, and the machine will automatically drive and feed the cutting tool through a selected movement, return the tool to a desired base position, and stop at the end of each operational cycle. Thus the machine is readily adapted to remote control through the use of pneumatic, hydraulic, electrical or remote mechanical servomotor devices which are capable of applying an initiating impulse or motivating action controlled from a remote station.

In addition, the design of the present machine is such that changes in tool rotational speed, length and speed of feeding strokes, torque, and dwell at the end of the feed stroke may all be accomplished with ease and relative rapidity. These many features are included in a machine which is relatively small and light in weight, and which actually is a portable machine tool since it is dependent only upon a suitable supply of motive energy, such as compressed air or electricity, and does not require external driving motors or the like. Because it is portable, the machine is versatile in its application, and may be used singly or in conjunction with like machines, or with other portable tools, for work on mass production jobs where mobility of the machine tool is desired.

In addition to its portability, the machine provided by this invention is designed for use with any number of different cutting tools for performing the various machining operations mentioned above. The rotational speed of the cutting tool and the rate of axial feeding movement of such tool may be varied as necessary through a relatively wide range by simple substitution of appropriate gear train subassemblies in the speed reduction-torque multiplication parts. Also, the gears connecting the output of the reduction gears to the work spindle and feed drive may be quickly and easily changed to provide a range of ratios of tool feed to tool rotational speed, as may be required in different machining operations and when operating on different materials.

All of the aforementioned changes in gearing, etc., may be accomplished with ease in the present machine, since the main housing of the machine is divided into complementary drive and control sections which house, respectively, the parts having functions as indicated by the name applied to that section. These housing sections can be separated merely by removing a few bolts, and the final drive and feed drive gearing is accessible at the thus opened end of the drive section. These gears may readily be removed and replaced to alter the final drive speed reduction, and more particularly to vary the tool feed to tool rotational speed ratios. In addition, the gear reduction subassemblies are readily removed as units, and other units having different speed ratios may be substituted to give outputs of higher or lower speed, and conversely of lower or higher torque.

The invention also provides for completely automatic cyclic operation of the machine from a base position in accordance with a preset work load or stroke. More specifically, in the operation of the machine, the work spindle is caused to advance at a predetermined rate to a pre-established axial limit or until its advance short of that limit meets with a preselected resistance. The drive responds to either of these conditions by effectively reversing to retract the work spindle at a relatively rapid rate to its base position, after which the drive is shut off and the controls reset for the next cycle.

Provision is also made in accordance with the invention for regulating the time interval between termination of the forward feeding movement of the work spindle and the start of its retracting movement, and this interval may be substantially instantaneous or may be of appreciable extent to provide a dwell period of variable time length. Such a dwell is useful for "clean up" purposes when drilling or boring blind holes, as well as in other machining operation where the cutting tool should "bottom" and "clean" to eliminate burrs or the like.

It is a primary object of this invention to provide an improved portable automatic machine tool capable of performing a complete work cycle in accordance with preselected conditions without attention from an operator.

Another object of this invention is to provide a portable machine for driving a rotating cutting tool and for moving such rotating tool axially through feeding and retracting strokes of predetermined length and at predetermined selectively variable rates relative to the rotational speed of the cutting tool.

An additional object of the invention is to provide such a machine having a spur gear drive to the work spindle which rotates the cutting tool and to the feed mechanism which controls axial movement of the cutting tool, thereby to reduce friction losses in the machine to a minimum.

A further object of this invention is to provide such a machine with controls for regulating the rotational speed of the cutting tool, cutting tool feed rate, the length of the feed stroke of the cutting tool, and for providing a dwell period of adjustable variable length at the end of the feed stroke before the beginning of the return stroke.

It is also an object of the invention to provide such a machine having controls for manually or automatically overriding the automatic cycle of operation to cut short the cycle of operation or to terminate completely the operation of the machine.

Another object of this invention is to provide a machine as outlined above which is capable of running through a complete cycle of operation in response to a single initiating impulse, and thereby to adapt the machine tool for automation.

An additional object of this invention is to provide improved tool holder adapters for retaining the cutting tools in the work spindle of the machine tool, and providing for release of the tapered shanks of cutting tools and the like from the machine with a minimum of effort.

It is a further object of the invention to provide a portable automatic machine tool including a housing divided into drive and control sections which may easily be separated for access to the driving parts of the machine, and also including within the housing a driving motor and apparatus in the control section for governing the supply of motive energy to the motor.

Other objects and advantages of the invention will be apparent from the following description, the accompanying drawings and the appended claims.

In the drawings:

Fig. 1 is a side plan view of the portable machine tool provided by the invention, with a suitable nose piece and guide bushing shown in section;

Fig. 2 is an exploded side plan view of the tool, showing the manner in which the drive and control sections of the housing are separated to provide access to the feed and drive gearing;

Fig. 3 is an exploded view of the drive section shown in Fig. 2, illustrating the manner in which the reduction gear sets, the motor, the governor, and the lubrication chamber are removed from that housing section;

Fig. 4 is a plan view of an alternate reduction gear set which may be substituted for the pair of reduction sets shown in Fig. 3;

Fig. 5 shows an alternate motor drive shaft for use with the reduction gear set of Fig. 4;

Fig. 6 is a plan view of the drive section of the housing taken from the side opposite from Fig. 1, illustrating the set-up access plate in an open position;

Fig. 7 is a partial vertical section taken on an enlarged scale through the access plate and surrounding parts of the housing shown in Fig. 6, with the plate in closed position;

Figs. 8a and 8b, taken together, are a vertical section through the tool, with certain parts shown partially in elevation for clarity, and with the control parts in a position to initiate an opening cycle of the tool;

Fig. 9 is a partial vertical section, similar to Fig. 8b, showing the control parts in position after the control cycle has been initiated;

Fig. 10 is a partial vertical section taken on line 10—10 in Fig. 8b;

Fig. 11 is a partial vertical section taken on line 11—11 in Fig. 8b;

Fig. 12 is a section taken through the work spindle, feed spindle, control spindle, and associated parts, taken on line 12—12 in Fig. 8b;

Fig. 13 is a perspective view of parts of the tool holder adapter shown in section in Fig. 8a;

Fig. 14 is a view, partly in section and partly in elevation, of a modified cutting tool holder provided by this invention;

Fig. 15 is a sectional view taken on line 15—15 in Fig. 14; and

Fig. 16 is an exploded vertical section through the modified tool holder, taken on line 16—16 in Fig. 15.

Referring to the drawings, which illustrate preferred embodiments of the present invention, Fig. 1 is a view of the assembled portable machine tool provided by this invention, shown as including a housing divided into complementary sections including a drive section indicated generally at 10 and a control section 12, normally connected by bolts 13 (Fig. 2). The drive section 10 houses the drive parts of the tool which are described below, and to one end of housing 10 a generally tubular nose piece 15 may be attached, including at its forward end a guide bushing 16 for guidance of a cutting tool 18 driven by the machine. This cutting tool may be of a suitable type for performing a desired machining operation. Specifically, the tool may be a drill, a reaming tool, a boring cutter, or a suitable tool for performing counterboring, countersinking, spot facing, and similar machine operations.

The control housing section 12 includes the control elements for governing operation of the drive parts in section 10, and includes a suitable fitting 20 for attachment to a source of motive power. In the described embodiment of the invention this fitting is arranged for attachment to a pressure air line, and is connected to an internal air passage indicated generally at 21 in Fig. 1, passing from the control section to the drive section, where the passage terminates in a pressure supply chamber 22 (see Fig. 8a) for supplying pressure fluid to a suitable small relatively high speed pneumatic motor, indicated generally at 25 in Fig. 8a.

It is understood that the present invention is not confined to the use of pneumatic drive motors and corresponding supply of pressure fluid for driving such motors. The invention contemplates the use of a suitable motor housed within the portable machine tool itself, and any electrical, hydraulic, or pneumatic motor can be used having the desired dimensional and power characteristics. For purposes of illustration, however, the tool is described as including a pneumatic motor with relatively high speed and low torque characteristics, suitable pressure fluid supply, and valve type controls.

The details of the pressure fluid supply are shown particularly in Fig. 8b, wherein the fitting 20 is seen as opening into a passage 23 to a main rotary shut off valve 24 controlled by exterior manually operative knob 26 (Figs. 1, 2 and 11). This valve is received within a bushing 27 and transverse passages 28 through which the pressure fluid may pass to a chamber 29 within which a reciprocating control valve 30 operates. This valve is mounted upon a stem 32 which is in turn slidably mounted in an outer bushing 33 and an inner bushing 34, and a spring 35 urges valve 30 normally closed upon its seat 36. This hollow seat surrounds the valve outlet leading to a chamber 37 having a cored connection within housing section 12 which leads to the main fluid supply passage 21, extending forwardly through the drive housing section 10 to chamber 22.

This latter chamber is defined by a fitting 40 having through passages 42 which lead into a governor chamber 44 housing a suitable centrifugal governor 45 which may be, for example, of the type shown in the copending application Serial No. 562,377, filed January 31, 1956 (Docket 3230) which is assigned to the same assignee as this application. A lubricant well 46 is defined on the other side of fitting 40 by a hollow cover plate 47, and includes a lubricant opening normally closed by access screw 48. This well 46 is normally filled with lubricant oil which is passed through a wick 50 carried in an adapter bolt 51 threaded into fitting 40. Thus, oil on the end of wick 50 projecting into the passages 42 is entrained in the pressure fluid and passes through the governor parts and motor 25 to lubricate the same.

Motor 25, governor 45, and fitting 40 all are slidably received within a relatively large bore 52 in the lower front part of housing section 10, with a suitable cylindrical spacer 53 surrounding the governor and defining the governor chamber 44. The outer end of fitting 40 is screw threaded into a counterbored and tapped part 54 of the housing to retain these parts in position, and removal of fitting 40 provides for removal of the governor and motor, as shown in Fig. 3, for purposes of repair or replacement. Surrounding motor 25 is an exhaust passage 55 which leads to an exhaust opening defined by a suitable baffle member 56 (Fig. 8b), from which the pressure fluid passing from the motor may pass to atmosphere.

*Reduction train assembly*

At the opposite or output side of motor 25 there is a further bore 60 of larger diameter than bore 52, and a spacer 62 is received therein, abutting the end of the motor housing. Against the spacer, received within bore 60, is a first ball bearing 65 which provides a mounting for one end of a first planet cage 67. The drive motor 25 includes an output shaft 70 upon the end of which are cut gear teeth forming a pinion 72 which acts as the sun gear of a first planetary gear train, and this sun gear meshes with planet gears, one of which is shown at 75 in Fig. 8b, and which is mounted upon a stub shaft 76 geared in the cage 67. Surrounding the planet gears is a further spacer 78 the internal surface of which includes gear teeth meshing with the planets 75 and forming the internal gear 79 of the first planetary gear reduction unit.

The forward end of the spacer 78 also carries a further ball bearing 80 supporting the forward end of cage 67. Abutting spacer 78 is a further ball bearing 82 which provides a rotatable mounting for the rear end of a second revolving planet cage 85, and the first cage 67 is provided with gear teeth forming a second sun gear 87, meshing with a second set of planetary gears one of which is shown at 90 in Fig. 8b, and which is mounted upon a stub shaft 92 by the cage 85. A retainer 93 is received about the shaft end of cage 85 to hold stub shafts 92 in place, and this retainer extends through the web portions of a single spacer member 95 screw threaded at 96 into the tapped end of bore 60 and including on its inner surface gear teeth providing the internal gear 98 of the second planetary reduction set.

It will be apparent from this construction that the two planetary gear sets may be removed individually from housing section 10, with the appropriate spacers, particularly as shown in Fig. 3. This provides for substitution of similar reduction gear trains having different speed reduction characteristics so that the effective output at the shaft end of planet cage 85 with respect to the rotation of the motor shaft 70 may be varied by appropriate changes in gearing. As an example, Fig. 4 illustrates a modified gear set 100 which may be a single planetary gear train of a predetermined reduction, and which may be substituted for the two reduction sets above described since the unit 100 can be matched to the combined dimensions of the two units as shown in Fig. 3. Along with the unit 100 a suitably modified motor shaft 70', and a modified drive pinion 72' which is provided as a separate unit threaded for connection to shaft 70', are shown in Fig. 5. These members may be substituted for the composite shaft and drive pinion 70, 72 shown in Fig. 8a.

Drive mechanism

The output of motor 25 is thus transmitted to the shaft portion of planet cage 85, with a resultant output there of reduced speed and amplified torque as compared to the motor output. Upon this planet cage there is carried a drive pinion 105, rotatively fixed to the planet cage by a key 106, and a spacer 107 abuts the other side of drive pinion 105, being in turn in abutment with a feed pinion 110 which is also keyed to the planet cage through key 111. A ball bearing 112 is carried upon the end of the planet cage 85, held in place thereon by a suitable nut 113, and the outer race of bearing 112 is received in a generally cylindrical mounting 115 which is bolted to a web 117 within the housing control section 12. In this manner the outwardly extending shaft portion of planet cage 85 is properly supported within the control section of the housing.

Referring to Figs. 8a and 8b, a main drive sleeve 120 is mounted in axially fixed relation within control section 10 by a rear needle bearing 122 at its rearward end, and by a radial-thrust bearing 124 at its forward end. A drive gear 125 is received about the rearward end of sleeve 120 and is rotatably fixed thereto by a key 126. Gear 125 is also held against axial movement relative to the sleeve by a lock ring 128 threaded to the end of sleeve 120 and including slit portions and associated lock screw 129, the tightening of which will cause separation of the slit parts of ring 128 in an axial direction, with resultant binding of the threaded parts and fixing of the position of the ring on the end of the sleeve. The forward radial-thrust bearing 124 is similarly retained upon the forward end of sleeve 120 by a lock ring 128' which is substantially identical to ring 128 in purpose and construction, and which serves to retain the bearing 124 in axially fixed position with respect to sleeve 120. Thus the initial or rotative feed force is transmitted from drive pinion 105 to drive gear 125 and thence to sleeve 120 which is supported for rotation within the housing but which is fixed against axial movement with respect to the housing.

Comparison of Figs. 8a, 8b and 12 shows that a substantial portion of the length of the sleeve, particularly between the forward and aft bearing mountings, is provided with a threaded outer surface 130, which thread preferably is a square-type right hand thread. At the forward end of such threaded portion there is carried a micrometer stop nut 135 having a suitable scale 136 inscribed on a portion of its outer surface, and a forward lock nut 137 is also threadedly received on sleeve 120, cooperating with a washer 138 having a tongue (not shown) which is received within a small longitudinal slot 139 along the threaded portion of sleeve 120 to retain washer 138 against rotation while permitting axial movement thereof along the sleeve. Lock nut 137 acts through washer 138 in a well known manner to lock the micrometer nut 135 in fixed relation to sleeve 120 once the micrometer nut has been set in a desired position upon the sleeve, defining a forward stop or abutment which limits the forward extent of feed movement as will presently be described.

At the rearward end of the threaded portion 130 there is a rear stop nut 140, a washer 141 which is identical to washer 138, and a rear lock nut 142. The stop nut 140 may be adjusted axially of sleeve 120, and locked in position by nut 142, thus to define a rear limit abutment which controls the base or beginning position of the movement of the tool.

It will be noted from Fig. 12 that the sleeve 120 includes three lengthwise slots 145, separated from each other by approximately 120° on radial center lines, and extending substantially the entire length of the threaded portion 130 of the sleeve. Within each of these slots there is slidably received a drive segment or block 148 which is secured by suitable bolts 149 to a work spindle 150 which is slidably received within sleeve 120. The base of segments 148 are received in an annular groove 151 to assure proper alignment thereof and to take some of the transmitted load off bolts 149. In this manner the spindle 150 is adapted for rotation with sleeve 120 and for axial movement with respect to the sleeve. It will be noted that work spindle 150 is tubular, and the interior surface thereof is provided with a feed thread 152 which is preferably a left-hand thread. Mating with this feed thread is a feed screw 155 the movement of which relative to work spindle 150 will determine rate and direction of axial movement of that spindle.

In other words, when spindle 150 and screw 155 are rotated in the same direction, and the screw is rotated at a slightly faster rate than the spindle, then the spindle will be moved forward, to the left as viewed in Figs. 1 and 8a and b, with the rate of such feed movement dependent upon the differential in rotation between these two members. However, if the screw 155 is held stationary while the work spindle continues to rotate in the same direction as before, the relative movement of these parts is reversed, and the speed differential between the two now being substantially greater, a resulting retraction movement of spindle 150 occurs at a much faster rate. Thus, it is seen that control of the rate and direction of rotation of feed screw 155 with respect to work spindle 150 will provide a control over the rate of feed movement and retraction. A cycle of operation thus includes a rotation of feed screw 155 in the same direction and at slightly greater speed than work spindle 150, i.e., feed movement, and a reversal of the relative movement of these parts, i.e., a retracting movement.

Feed screw drive

Within the rear end of sleeve 120 there is a ball bearing 157 retained in place by an externally threaded retaining collar 158 including a slit portion and locking set screw 159. This bearing receives a generally cylindrical thrust spindle 160 including a peripheral collar 162 which abuts the inner race of bearing 157, and on its other side engages a spacing washer 163 against which a feed gear 165 is retained through the medium of a further spacing washer 166 and a retaining ring 167. Gear 165 meshes with feed pinion 110 and is rotatably mounted upon thrust spindle 160 by a needle bearing 168. The rear face of gear 165 is provided with dogs 170 which are adapted to engage similar dogs 172 on a sliding clutch member 175 which includes a generally cylindrical forward portion 176 slidably received within thrust spindle 160. The clutch member is provided with an internal keyway receiving a pair of keys 178 extending from a feed spindle 180, thus providing a splined connection between clutch 175 and feed spindle 180.

This spindle includes a collar portion 182 which abuts an internal shoulder within thrust spindle 160, and the other side of which collar provides an abutment for a control spring 185 engaging the portion 176 of the clutch member and urging it rearwardly of the thrust spindle as shown in Fig. 8b. Feed spindle 180 extends forward coaxially within work spindle 150, and at its forward end (Fig. 8a) is provided with a key 187 providing a driving connection to feed screw 155. The forward end of spindle 180 is threaded at 188 and receives a lock nut 190 and lock washer 192 which hold the feed screw in position over key 187. A relatively heavy thrust spring 195 extends about feed spindle 180, engaging feed screw 155 at its forward end. At its rearward end (Fig. 8b) the thrust spring is engaged by a number of spacers 197 the last of which seats against thrust spindle 160, and the thrust spring 195 can be preloaded by addition or removal of one or more of these spacers 197.

From the above description it follows that feed movement of work spindle 150 is brought about by driving feed screw 155 in the same direction and at a slightly greater speed than the work spindle. The ratio between feed pinion 110 and feed gear 165 is greater, by a preselected amount, than the ratio between drive pinion 105 and drive gear 125. Variation in this difference in gear ratios, principally by replacing the feed pinion and feed gear with others providing a different ratio, affords a control over the rate of feed with respect to tool rotation. The feed drive is from feed gear 165 through dogs 170 and 172 to clutch 175, through keys 178 to the feed spindle 180, and thus to the feed screw 155.

*Control mechanism*

As previously mentioned, the present invention provides a machine tool which automatically runs through a complete cycle once initiated and then stops. The control mechanism is contained within the control housing section 12, and includes a cam member 200 which is rotatably mounted at its forward end within a needle bearing 202 carried in housing web 117, and at its rearward end by a ball bearing 203 received in housing section 12. The cam member is retained in fixed axial position by a nut 205 threaded to that end of the cam member which extends through ball bearing 203, and the nut is held against rotation by a tongued lock washer 206, the tongue of which is received within a slot 207 in the end of the cam member upon which the nut is received. This nut and bearing are enclosed with a suitable cap 208 threaded to the housing.

The forward end of cam member 200, that part which is received in needle bearing 202, extends about the clutch 175, and includes dogs 210 for operably engaging dogs 212 (Fig. 9) on the rear face of clutch 175. The purpose of these dogs is to retain clutch member 175 against rotation when it is desired to effect retracting movement of the work spindle. The central portion of cam member 200 includes one raised lobe 215 on its outer surface, contoured to engage a roller follower 220 which serves to retain cam member 200 against rotation. The roller is mounted upon a stub shaft or bolt 221 in the center of a lever arm 222 (Fig. 10), and this arm is provided with a pivotal mounting 225 within the housing section 12, to one side of the roller. The other end of lever arm 222 carries a guide block 226 which serves as an abutment for a cam spring 228, this spring extending through a bore 229 in the body of housing section 12, and being provided with an adjustable stop which is a threaded plug 230. Access to plug 230 is provided by a cover plug 231. The force of spring 228 therefore acts to detain the cam member 200 against rotation, and in order for the cam member to move the force exerted upon it through clutch 175 must be sufficient to overcome the force of roller 220, which is roughly twice the force exerted by spring 228.

A plunger 235 is slidably received within a bore 236 in the housing section, extending below the roller 220, and a plunger spring 237 acts to force the plunger upwardly against roller 220, this spring seating at its lower end upon a threaded cap 238. Approximately at its center the plunger 235 includes a portion 240 of reduced diameter, this portion being generally aligned with the valve stem bushing 34, as seen particularly in Figs. 8b and 9. In order for control valve 30 to be closed, the plunger 235 must be depressed to permit the end of valve stem 32 to extend into the reduced part of the plunger, as shown in Fig. 8b. Thus, when the valve is opened the plunger is biased upwardly by spring 237 and the valve cannot close until the plunger is pushed in a downward direction by roller 220, and as seen above this action of the roller occurs only when the force exerted through clutch 175 is sufficient to rotate cam member 200. It follows, therefore, that when the resistance to rotation of cam 200 offered by the detent mechanism is overcome, control valve 30 will be closed automatically to cut off the motive fluid supply to the motor and stop the machine.

A bearing carrier 245 is bolted to clutch member 175, and contains a ball bearing 246 held in place therein by a suitable snap ring 247. The inner race of this bearing forms a forward support for a generally tubular control spindle 250 which is slidably mounted in a bore 251 within cap 208 and cam member 200, and which is secured at its forward end to the inner race of bearing 246 by a snap ring 252. The control spindle 250 is counterbored at 254 through a major portion of its length, and a lock screw 255 is threaded into the outer end of the control spindle. Within the control spindle there is a coaxial slidably received lock spindle 260, the forward portion of which is received in the forward end of the control spindle, and the central portion of which includes a part 261 of larger diameter slidably received within the counterbore 254. At its forward end the part 261 includes a tapered surface 262, and between the rearward end of part 261 and the end of lock screw 255 there is a lock spring 265 which tends to bias the lock spindle in a forward direction. The bias of this spring is resisted by a pair of balls 267 carried in radially extending holes 268 in the control spindle 250. As shown, these balls are greater in diameter than the wall thickness of spindle 250, and engage the tapered forward edge 262 of the enlarged central part of the lock spindle. In Fig. 8b, these balls are shown retained in position by their engagement with the walls of the bore in cam member 200 through which the control spindle extends.

An undercut 270 is formed in the walls of this bore surrounding the control spindle, and thus when the control spindle is moved forward the balls 267 will enter the undercut 270, permitting the lock spindle to slide forward relative to control spindle 250, under the bias of spring 265, thus locking the control spindle in a forward position where the dogs 170 and 172 are engaged (see Fig. 9). An adjusting rod 275 is threaded at 276 to the forward end of lock spindle 260, and the forward end of this rod provides a stop abutment for the lock spindle, being adapted to engage a hardened button 277 which is press fitted on the rear end of feed spindle 180. The rearward end of rod 275 is also threaded to receive an adjusting nut 279 which provides a locking arrangement to retain the rod in fixed position with respect to the lock spindle, and which also functions to retain a knob 280 on the end of the lock spindle.

A main control lever 285 is pivotally mounted at 286 to the rear of housing section 12, and includes a bifurcated end 288 which extends around the end of control spindle 250 and is adapted to engage a shoulder 289 thereon when moving in one direction, and to engage the lock screw 255 in the other direction. This handle also includes an aperture 290 which receives the outwardly extending end of the main valve stem 32, and a nut 292 is threaded to the end of valve stem 32 to provide an adjustable abutment against which the lever 285 will exert an opening force to move valve 30 to its open position. An operating knob 295 is also provided at one end of lever 285 for manual operation of the lever. It will be clear from an inspection of Figs. 8b and 9 that rotation of lever 285 in a counterclockwise direction as viewed therein will pull valve 30 to an open position, where it is retained by movement of plunger 235, and will push the control spindle 250 inwardly to a position where the balls 267 are aligned with undercut 270 and the bias of spring 265 can act to force the balls outwardly and move the lock spindle forward. This, of course, disengages the dogs 210 and 212 and engages the dogs 170 and 172.

*Adjustment features*

The manner in which the speed of rotation of the drive pinion and feed pinion can be controlled has already been described in connection with Fig. 3. An adjustment is also provided for the differential in rotation between work spindle 150 and feed spindle 180. Referring to Fig. 2, this adjustment is accomplished by removing the feed pinion 110 and feed gear 165 and substituting other gears of different speed ratios for these. This change of parts is relatively simple due to the construction of the present machine. It will be apparent from an inspection of Fig. 2 that it is necessary only to remove the bolts 13, withdraw the housing control section 12 and the control parts carried therein, and to remove the nut 113 and snap ring 167 whereby these parts may be removed and replaced as shown in Fig. 2.

The thrust limit controlled by thrust spring 195 is also adjustable by removing the thrust spindle 160 and adding or subtracting to the number of spacers 197, thereby changing the preload on the thrust spring. Thus, the thrust spring will provide yieldable resistance to axial movement of feed screw 155, and control the amount of thrust exerted on the cutting tool. If the thrust force exceeds the predetermined limit, then the feed spindle will move axially rearwardly against the bias of thrust spring 195 to initiate a shutoff operation.

The side of housing section 10 opposite from that seen in Fig. 1, and shown in Fig. 6, contains an access door 300 hinged at 302 to the housing, and carrying a pair of latches 303 which are pivotally mounted through suitable screws 304 (Fig. 7) on the door 300. The latches include pawls 305 adapted to engage the inner side of the housing and retain the door in closed position. Limits of movement of the latches are defined by suitable stop pins 306.

With the door opened, as shown in Fig. 6, the operator may rotate the micrometer nut and back stop nut, and their respective lock nuts, as by inserting a suitable tool in the socket holes provided about the periphery of these nuts, and in this way he may adjust the position of the front and rear limits for drive segments 148 to vary the extent of feed movement. If desired, a suitable chart 308 may be carried on the inner side of door 300 for the purpose of recording the data pertinent to installed feed speed and thrust components.

Another adjustment provided in the present machine relates to the length of dwell of the cutting tool at the forward limit of the feed stroke. The nature of this adjustment will be more apparent from the following discussion of an operating cycle of the machine, but it may be noted here that an adjustment of the length of the dwell period is provided by adjusting rod 275 axially with respect to the lock spindle 260.

*Cycle of operation*

Assuming that a suitable cutting tool has been mounted in the work spindle, in a manner which will be described below, and assuming also that the proper reduction gearing and drive and feed gearing have been selected for a particular operation, the tool is started merely by causing control lever 285 to rotate in a counterclockwise direction as viewed in Figs. 8b and 9. This operation may be accomplished manually by pulling on the knob 295 or pushing inwardly upon knob 280, or it may be accomplished from a remote control source by attaching a suitable electric, hydraulic, or pneumatic servomotor to operate the control lever. In this way, therefore, since this single movement is the only one required to initiate a complete cycle of operation, the present machine readily lends itself to automation.

It is assumed that the main valve 24 is open, and thus this operation of the control lever supplies motive power to the motor 25 since it draws the control valve 30 to an open position. The plunger 235 moves upward to engage roller 220 and at the same time locks the control valve in its open position. This same movement of the main control lever causes the control spindle 250 to be thrust forward until the clutch 175 reaches its forward or feed position, shown in Fig. 9, where the dogs 170 and 172 engage. In this position the balls 267 are aligned with undercut 270, and the bias of spring 265 thrusts the lock spindle forward, moving the balls radially outwardly as shown in Fig. 9, and the lock spindle continues in its forward movement until the forward end of the rod 275 engages button 277. It will be noted that this forward movement of clutch 175 is accomplished against the bias of control spring 185, and thus the ball and undercut arrangement provides a lock resisting the bias of the control spring and retaining the clutch 175 in forward position.

Since the motor is started feed gear 165 and drive gear 125 are rotated in the same direction, but at different speeds, due to the differences in ratio between the feed pinion 110 and feed gear 165 and between the drive pinion 105 and drive gear 125. Sleeve 120, and therefore work spindle 150, are thus rotated at the speed desired to rotate the cutting tool, and feed spindle 180 and feed screw 155 are rotated in the same direction at a slightly greater speed. Since the normal rotation of a cutting tool, and as provided herein, is clockwise when viewed from the driving end, or when looking from right to left of Fig. 1 of the drawing, and since the feed screw is provided with a left-hand thread, the relative movement between the feed screw and work spindle results in axial translation of the work spindle relative to sleeve 120. This provides a forward feed movement of the cutting tool.

The feed movement ceases when the drive segments 148 engage the micrometer nut 135 providing the forward limit abutment. Since the work spindle can no longer move relative to the feed screw, which has heretofore been held axially stationary by thrust spring 195, the feed screw now commences to move in the opposite direction, or to the right as viewed in Fig. 8a. Substantially the same action will occur if, before the cutting tool reaches the forward limit of feed movement, the predetermined upper limit of thrust force is exceeded. The effect will be the same, namely, the thrust force passed to feed screw 155 will cause it to move axially against the yieldable thrust resistance provided by the thrust spring 195, and a retracting movement will be initiated.

This results in a compressive force upon the thrust spring 195, and as this spring yields the feed spindle 180 moves to the right and pushes the lock spindle 260 to the right, at the same time further compressing the control spring 185. When the lock spindle moves past balls 267 the now increased biasing force of spring 185 upon clutch member 175 causes that member to transmit a substantial axial thrust against the control spindle 250 and the balls 267 are forced radially inwardly to unlock the control spindle. With the control spindle thus unlocked the clutch member 175 is thrust rearwardly by control spring 185, disengaging dogs 170 and 172 and engaging dogs 210 and 212.

During the interval required for the feed spindle 180 to move the lock spindle to its unlocked position, and for the clutch member 175 to become disengaged and engaged with the cam member 200, the work spindle is being driven continuously, but feed movement has stopped. There is thus provided a dwell period at the end of the feed stroke which is desirable to assure a finished surface on operations such as blind hole drilling, countersinking, counterboring and spot facing. The duration of this dwell may be readily adjusted as mentioned above, by releasing the lock nut 279 and, while retaining the lock spindle 260 against rotation, threading the adjustment rod 275 inwardly for a decrease in length of dwell, or threading the rod 275 outwardly, to the right in Fig. 8b, for increased length of dwell. The reason for this is apparent when it is realized that the overlap of the enlarged portion 261 of the lock spindle with respect to the holes 268 carrying the locking balls 267 is determined by the engagement of the forward end of adjustment rod 275 with the button 277 on the feed spindle 180. If this overlap is reduced then a smaller movement of the work spindle is required to release the balls from their locking position, with a consequent reduction in length of dwell.

For the moment the clutch member 175 is held stationary by cam member 200, and therefore feed screw 155 is also stationary. This reverses the relative movement of the feed screw and work spindle, with resulting retracting movement of the work spindle at a rate considerably in excess of the feed movement. When the work spindle reaches the back stop position, defined by engagement of drive segments 148 with the back stop nut 140, further relative movement of the work spindle and feed screw is impossible. The torque transmitted through feed spindle 180 thus increases and this increased torque is transmitted to clutch member 175 and thus to cam member 200.

The increased torque load on this cam member causes it to rotate against the bias of the detent roller 220, forcing the roller downwardly and carrying plunger 235 downwardly to a position where the reduced part 240 thereof is again aligned with the end of valve stem 32. Valve spring 35 immediately closes the control valve 30 and operation of the motor, and of the entire machine, ceases. The main control lever 285 had already been returned to its initiate position by reason of the outward movement of the control spindle when the lock balls 267 released. The machine is, therefore, prepared for another cycle of operation.

If, at any time during the course of a cycle of operation it becomes necessary to shut off the machine this may be accomplished merely by closing the main valve 24. If it is desired to place the machine in a retractive and shut-off cycle before the feed stroke is completed this may be done by pulling knob 280 to the rear to release the locking balls 267, and that portion of the above described cycle beginning with release of the control spindle will immediately commence, leading to full retraction of the work spindle and shut off. This feature may also be used to eliminate the above described dwell period completely if so desired.

Tool holder adapters

The present invention also embodies novel tool holder adapters for mounting conventional taper shank cutting tools, or the tapered shank of a chuck, in the end of work spindle 150. One such adapter is shown in Figs. 8a and 13, and includes an adapter socket 310 having a tapered inner surface 312 for receiving and frictionally retaining the tapered socket 313 at the end of a suitable cutting tool such as drill 18 (Fig. 1). The rearward end of socket 310 includes a slot 314 which receives a tang 315 on the end of the tapered tool 313. Within the end of work spindle 150 there is a plate 320 seated against a shoulder 322, and preferably made of a hardened material. A light ejector spring 324 may be inserted between the end of socket 310 and plate 320 if desired.

An adapter ring 325 having a threaded exterior surface 326 is connected by bolts 327 to the enlarged end 328 of work spindle 150, and suitable lugs or dogs 330 extend from the enlarged end 328 into mating slots 331 to transmit the driving force and take the majority of the load off bolts 327. A retaining ring 334 is threaded over the exterior of adapter ring 325, and includes a flange 335 which serves to retain socket 310 in position within the work spindle. The forward face of adapter ring 325 is provided with two sets of mating slots, as shown in Fig. 13, the first set 337 are relatively shallow, and are shown as axially aligned with the slots 331 in the back face of the ring. The other set of slots 338 are located 90° from the first set 337, and are substantially deeper than the slots 337 as will be apparent from an inspection of Figs. 8a and 13. A pair of ears 340 extend from the surface of socket 310, spaced 180° apart, for reception alternately in one of the other of these sets of shallow and deep slots, and these ears 340 are held in the desired slots by flange 335.

The purpose of this arrangement is to provide a means for readily unseating the locked tapered parts of the socket and tool shank, this normally being a somewhat difficult operation since these two parts are located in a blind hole within the end of the work spindle, and since it is considered time consuming to remove the entire socket merely for removal of the cutting tool. Assuming that a cutting tool is in place and in need of replacement, and assuming lugs 340 to be in the shallow slot 337, in the position shown in Fig. 8a, the tool may be easily removed from the socket by loosening retainer ring 334 to permit the socket 310 to be withdrawn sufficiently for the lugs or ears 340 to pass over the lower front parts 342 of the adapter ring. The socket is then rotated 90° to align lugs 340 with the deeper slots 338 and retaining ring 334 is tightened, forcing the tang 315 of the drill against the plate 320, and breaking the tight frictional engagement between the locked tapered parts 313 and 312. The socket is then returned to the normal drive position as illustrated in Fig. 8a before a new cutting tool is placed therein.

Another tool adapter provided by this invention is shown in Figs. 14-16, and includes a socket 345 having opposed axially extending slots 347 in its outer surface, these slots being joined by a cross slot 348 at the inner end of the socket. A circular shoulder 350 on the socket is adapted to be secured by bolts 352 to the end 328 of the work spindle 150, and the lugs 330 extending from the work spindle are received within slots 353 in the shoulder portion. A generally U-shaped draw bar 355 is recevied within the slots 347 and 348 of socket 345, and the enlarged head parts 356 of the draw bar are threaded at 357 to engage the threaded interior of a draw bar nut 360. This nut is received over the end of socket 345 and retained in position thereon against the front face of shoulder 350 by a suitable snap ring 362 received in an annular slot 363 at the end of the socket.

When the tapered shank 313 of a cutting tool is received within the tapered inner surface 365 of the socket the tang 315 extends through the rearward slot 348, and draw bar 355 is backed into the work spindle to provide adequate room for a positive engagement between these complementary tapered parts. When it is desired to release the cutting tool, nut 360 is rotated to pull draw bar 355 forward, engaging tang 315 and breaking the tight frictional engagement between the locked tapered parts 313 and 365.

Summary

The present invention, therefore, provides a portable automatic machine tool which is capable of running through a complete cycle of operation upon application of an initiating movement to the single main control lever 285. As explained in the body of the preceding specification the rotational speed of the cutting tool may be varied by choosing appropriate sizes of planetary sets and governors and the differential in speed between the feed screw and work spindle, which in turn controls the rate of feed, may also be varied by selected appropriate sizes of feed pinion and feed gear. The replacement of these gears may be accomplished with relative ease since the housing is divided into the respective drive and control sections which are readily separable as shown in Fig. 2, giving direct access to these gears and to the reduction gear subassemblies as shown in Fig. 3. Adjustments of the length of feed stroke and of the location of the base limit of the work spindle may be made by opening the access door 300 and manipulating the micrometer nut and back-stop nut as shown in Fig. 6. The micrometer scale on the micrometer nut 135 provides for an exact determination of the forward limit of feed stroke. The duration of the dwell period is controlled by adjusting the lock rod 275.

Another important feature is provided by the controlled thrust force limit which causes the tool to retract and stop if the thrust upon the cutting tool exceeds a predetermined upper limit. The machine, therefore, will reverse and stop itself if the cutting tool becomes dull and excessive thrust is required, or if for some other reason the cutting tool runs into an obstruction which causes excessive thrust load. It is clear, therefore, that although the machine is portable it provides complete control over its cycle of operation.

Suitable mounting pads 370 (Figs. 1 and 2) are formed at the top of housing drive section 10, and these pads are tapped to receive mounting bolts for mounting the entire tool on a bracket or the like. These pads provide accessory mounting accommodations or the like, but the main thrust receiving mounting of the machine is provided by suitable bolts (not shown) which are threaded into the nose 375 of housing section 10. The resistance to feed thrust forces is transmitted to this nose portion of the tool through the front thrust bearing 124 and from the radial thrust bearing 157 through drive sleeve 120. In this manner, the structure of the housing may be considerably lightened, contributing to the portability of the tool, since the walls of the housing are not relied upon for transmission of thrust forces or the like.

Frictional losses within the machine are kept at a minimum by the provision of spur gearing, particularly in the main drive and feed drive gears where heretofore the use of worm gearing has sometimes been proposed. Spur gearing is well recognized as being more efficient, and its use therefore provides for adequate power at the work spindle while employing a relatively small drive motor and stages of reduction gearing such as disclosed herein. These features contribute further to the portability of the tool.

It will be noted, also, that in addition to the lubricant well 46 which provides proper lubrication of the governor and pneumatic motor, a number of grease fittings 377 are provided for conveying lubricant to the bearings, and gearing within the housing. These fittings are shown at the top of the respective housing sections 10 and 12 in Figs. 8a and 8b. It will be apparent, therefore, that the present invention provides a portable automatic machine tool which is efficient and versatile, and which is adaptable to many different applications in industry.

While the form of apparatus herein described constitutes preferred embodiments of the invention, it is to be understood that the invention is not limited to these precise forms of apparatus and that changes may be made therein without departing from the scope of the invention which is defined in the appended claims.

What is claimed is:

1. An automatic machine tool of the character described comprising a housing, a work spindle mounted in said housing, means for carrying a cutting tool at one end of said spindle, means for rotating said spindle, feeding means including parts connected to said spindle and rotatable relative thereto for feeding said spindle in an axial direction forward from a base position to advance the tool at a predetermined ratio with respect to its rate of rotation, means for limiting the forward feeding movement of said spindle to a predetermined outward travel with respect to said base position, means providing a variable dwell of said spindle at the end of its forward feeding movement, means responsive to the cessation of forward feeding movement of said spindle for reversing the relative movement of said parts and said spindle to retract said spindle to its base position, and means operative in response to return of said spindle to its base position to disable said spindle rotating means and said retracting means.

2. An automatic tool of the character described comprising a housing, a work spindle supported in said housing and having a mounting at one end thereof for carrying a tool, means defining a base position for said spindle, means for advancing said spindle from said base position including parts connected to said spindle and rotatable relative thereto to provide a feeding movement of said tool, means for defining the forward feed limit of said spindle, means operative in response to said spindle reaching said forward limit for reversing the relative movement of said parts and said spindle to initiate retracting movement thereof to the base position, means providing a variable dwell between the end of feed movement of said spindle and retracting movement thereof, means for rotating said spindle at substantially constant speed through the cycle of movement of said spindle commencing with advancing of said spindle away from said base position and terminating upon return of said spindle to said base position, and means operative upon return of said spindle to its base position to disable said retracting means and said spindle rotating means.

3. An automatic portable machine tool comprising a housing divided into complementary drive and control sections, said drive section having a tool receiving opening therein, a drive sleeve rotatably mounted in said drive section and having one end aligned with said opening and having its other end extending into said control section, a drive gear fixed to the other end of said sleeve, a drive motor carried in said drive section, a gear train subassembly carried in said drive section, said gear train having a connection to said motor and including an output shaft extending into said control section, a tubular work spindle carried in said sleeve, said work spindle being rotatably fixed to said sleeve and movable axially thereof outwardly through said opening, means on said spindle for carrying a tool with the working end thereof outwardly of said opening, a feed screw threadably received in the interior of said spindle, a feed spindle extending coaxially in said work spindle and fixed at the forward end to said screw, the rear end of said feed spindle extending into said control section, a feed gear carried on said rear end of said feed spindle, and means in said control section for selectively connecting said feed gear to said feed spindle and for holding said feed spindle stationary to provide feeding and retracting movements of said work spindle.

4. A machine for rotating a cutting tool and simultaneously moving the tool axially through feeding and retracting strokes, comprising a driving sleeve, a work spindle carried in said sleeve for rotation therewith and movable axially thereof, means defining a base position of said spindle within said sleeve, said spindle having an internal threaded surface, a feed screw threaded into said work spindle, a feed spindle fixed to said screw and extending outwardly of said work spindle, drive means for rotating said driving sleeve and said feed spindle at different relative speeds to rotate said work spindle and simultaneously to feed it axially forward of said sleeve, means for limiting the forward axial movement of said work spindle with respect to said sleeve, means responsive to movement of said feed spindle resulting from resistance to forward movement of said work spindle for disengaging said feed spindle from said drive means, means responsive to disengaging of said feed spindle and said drive means for holding said feed spindle stationary to effect retracting movement of said work spindle into said sleeve, and means operative upon return of said work spindle to its base position to disable said drive means.

5. An automatic machine tool including the combination of a work spindle mounted in a housing for rotative and axial movement, a feed screw threadably engaged with said work spindle, drive means connected to rotate said work spindle, a separable drive connection between said drive means and said feed screw providing for rotation of said feed screw at a differential rate with respect to said work spindle to effect axial feeding movement of said work spindle, means providing base and forward limits to movement of said work spindle for defining the length of feed stroke, yieldable means arranged to resist axial movement of said feed screw, means for separating said drive connection in response to axial movement of said feed screw against said yieldable means on engagement of said work spindle with said forward limit, means actuated following separating action of said drive connection for retaining said feed screw against rotative movement for reversing the relative movement of said feed screw and said work spindle to effect an axial retracting movement of the latter, and means for disabling said drive means responsive to the increase in load transmitted to said retaining means upon engagement of said work spindle with said base limit.

6. An automatic machine tool including the combination of a work spindle mounted for rotative and axial movement, a feed screw threadably engaged with said work spindle, drive means connected to rotate said work spindle, a separable drive connection between said drive means and said feed screw providing for rotation of said feed screw at a differential rate with respect to said work spindle to effect axial feed movement of said work spindle, means providing base and forward limits to movement of said work spindle for defining the length of feed stroke, yieldable means arranged to resist axial movement of said feed screw, sensing means operable in response to axial movement of said feed screw against said yieldable means on engagement of said work spindle with said forward limit for separating said drive connection, yieldably biased means arranged to retain said feed screw against rotative movement, means actuated by said sensing means following said separating action thereof to connect said retaining means to said feed screw upon separation of said drive connection for reversing the relative movement of said feed screw and said work spindle to effect an axial retracting movement of the latter, and means responsive to movement of said yieldably biased means to disable said drive means upon an increase in force transmitted to said yieldably biased means by engagement of said work spindle with said base limit to terminate the retracting stroke and shut off the machine.

7. In an automatic machine tool of the character described the combination of a housing divided into complementary drive and control sections readily separable for access to the parts housed therein, a tubular work spindle having a forward end projecting from said drive section and including means for mounting a cutting tool, means in said drive section mounting said work spindle for rotative movement and for axial feed movement outwardly of said drive section, said work spindle including a threaded inner surface, adjustable stop means for engaging said work spindle providing base and forward limits to movement thereof to define the length of feed stroke, a feed screw received in threaded engagement within said work spindle, yieldable means arranged to resist axial movement of said feed screw with respect to said housing, drive means connected to rotate said work spindle, a separable drive connection between said drive means and said feed screw providing for rotation of said feed screw at a differential rate with respect to said work spindle to effect an axial feeding movement of said work spindle, sensing means operable in response to axial movement of said feed screw against said yieldable means upon stoppage of said work spindle at its forward feed limit for separating said drive connection, means actuated by said sensing means following said separating action thereof to retain said feed screw against rotative movement and thus to reverse the relative movement of said feed screw and said work spindle to effect an axial retracting movement of the latter, and means for disabling said drive means in response to the increase in load transmitted to said retaining means upon stoppage of said work spindle at its base limit at the completion of retracting movement.

8. A machine for rotating a cutting tool and simultaneously moving the tool axially through feeding and retracting strokes, comprising a tubular work spindle mounted for rotation about its longitudinal axis and having its internal surface threaded throughout a substantial extent of its length, a feed screw threaded into said work spindle, a feed spindle fixed to said screw and extending outwardly of said work spindle, drive means for simultaneously rotating said work spindle and said feed spindle at relatively different speeds to provide for rotation of said work spindle and concurrent axial feeding movement of said work spindle with respect to said feed screw, means responsive to a predetermined resistance to the axial feeding movement of said spindle for disengaging the drive to said feed spindle, yieldably biased means operatively arranged to engage and hold said feed spindle stationary upon disengaging of said feed spindle from its drive means to provide for relative movement of said work spindle and said feed screw at a higher rate and in an opposite direction for a rapid axial retracting movement of said work spindle, and means responsive to movement of said yieldably biased means to disable said drive means upon an increase in the force exerted on said biased means at the end of the retracting stroke.

9. A portable machine for rotating a cutting tool and simultaneously moving the tool axially through feeding and retracting strokes, comprising a tubular work spindle mounted for rotation about its longitudinal axis and having a threaded surface throughout a substantial extent of its length, a feed screw threaded to said work spindle, a feed spindle fixed to said screw, drive means including a drive motor housed in said machine for simultaneously rotating said spindle and said feed shaft at relatively different speeds to provide for rotation of said work spindle and concurrent relative axial movement of said work spindle with respect to said feed screw, means responsive to a predetermined resistance to the axial feeding movement of said work spindle for reversing the direction of relative rotation of said work spindle and said feed screw to reverse the relative axial movement of said work spindle and said screw and thus to effect a retracting movement of said work spindle, and means for disabling said drive means at the end of the retracting stroke.

10. A machine for rotating a cutting tool and simultaneously moving the tool axially through feeding and retracting strokes, comprising a tubular work spindle mounted for rotation about its longitudinal axis and having its internal surface threaded throughout a substantial extent of its length, a feed screw threaded into said work spindle, a feed spindle fixed to said screw and extending outwardly of said work spindle, drive means for simultaneously rotating said spindle and said feed shaft at relatively different speeds to provide for rotation of said work spindle and concurrent relative axial movement of said work spindle with respect to said feed screw, means responsive to a predetermined resistance to the axial feeding movement of said work spindle for reversing the direction of relative rotation of said work spindle and said feed screw to reverse the relative axial movement of said work spindle and said screw and thus to effect a retracting movement of said work spindle, and means responsive to an increase in the force transmitted through said feed spindle at the end of the retracting stroke operative to disable said drive means.

11. A portable automatic machine tool of the character described comprising the combination of a housing divided into complementary drive and control sections readily separable for access to the parts housed therein, a drive motor in said drive section, a fitting in said control section adapted for connection to the source of motive power for said drive motor, means for supplying motive power from said fitting to said motor when said drive and control sections are assembled and including a main control member in said control section operative to connect and disconnect said supply means to said motor, a tubular work spindle having a forward end projecting from said drive section and including means for mounting a cutting tool, means in said drive section mounting said work spindle for rotative movement and for axial feed movement outwardly of said drive section, said work spindle including a threaded inner surface, adjustable stop means for engaging said work spindle providing the base and forward limits of movement thereof to define the length of said stroke, a feed screw recieved in threaded engagement within said work spindle, yieldable means arranged to resist axial movement of said feed screw with respect to said drive housing section, drive means in said drive section connecting said motor to rotate said work spindle, means including a separable drive connection between said drive means and said feed screw providing for rotation of said feed screw at a differential rate with respect to said work spindle to effect axial feeding movement of said work spindle, said drive connection including a clutch member slidably mounted in said control section, locking means in said control section for retaining said clutch member in position to complete said drive connection, means in said control section associated with said locking means for releasing said locking means and separating said drive connection in response to axial movement of said feed screw against said yieldable means responsive to stoppage of said work spindle at its forward feed limit, means in said control section actuated upon separation of said drive connection to retain said feed screw against rotative movement for reversing the relative movement of said feed screw and said work spindle to effect an axial retracting movement of the latter, and means connecting said retaining means and said main control member for closing the latter to shut off said motor in response to an increase in load transmitted to said retaining means upon stoppage of said work spindle at the base limit of retracting movement.

12. In a portable automatic machine tool the combination of a housing, a mounting nose on said housing, a work spindle, means mounting said work spindle for rotational and axial movement in said housing including a thrust bearing at the forward end of said work spindle seated in said mounting nose, a feed screw threaded to said work spindle, means for rotating said work spindle and said feed screw at differential rates, means for resisting axial movement of said feed screw to effect an axial feeding movement of said work spindle outwardly through said mounting nose, and means connected with said resisting means for transferring the axial thrust load on said feed screw to said thrust bearing to apply the thrust loading directly to said mounting nose and to relieve said housing of said thrust load.

References Cited in the file of this patent

UNITED STATES PATENTS

| | | |
|---|---|---|
| 728,276 | Muehlberg | May 19, 1903 |
| 2,178,915 | McKee et al. | Nov. 7, 1939 |
| 2,416,339 | Mathys | Feb. 25, 1947 |
| 2,590,629 | Linden et al. | Mar. 25, 1952 |
| 2,618,180 | Linden et al. | Nov. 18, 1952 |
| 2,784,616 | Quackenbush | Mar. 12, 1957 |
| 2,791,922 | Robinson | May 14, 1957 |